United States Patent
Craig et al.

(10) Patent No.: US 8,316,742 B2
(45) Date of Patent: Nov. 27, 2012

(54) CUTTING TOOL WITH INTEGRATED CIRCUIT CHIP

(75) Inventors: Karen Anne Craig, Greensburg, PA (US); Thomas O. Muller, Greensburg, PA (US); Timothy E. Fara, Burr Ridge, IL (US); Bernard North, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 914 days.

(21) Appl. No.: 12/331,966

(22) Filed: Dec. 10, 2008

(65) Prior Publication Data

US 2009/0175694 A1 Jul. 9, 2009

Related U.S. Application Data

(60) Provisional application No. 61/012,818, filed on Dec. 11, 2007.

(51) Int. Cl.
*B23Q 17/09* (2006.01)
*B23B 3/00* (2006.01)

(52) U.S. Cl. ............................................. 82/1.11; 82/48
(58) Field of Classification Search .................. 82/1.11, 82/117, 118, 47, 48
See application file for complete search history.

(56) References Cited

U.S. PATENT DOCUMENTS

| 4,588,339 | A | 5/1986 | Bilz |
| 4,742,470 | A | 5/1988 | Juengel |
| 4,856,177 | A | 8/1989 | Takeuchi et al. |
| 4,890,306 | A | 12/1989 | Noda |
| 6,094,793 | A | 8/2000 | Szuba |
| 6,118,249 | A | 9/2000 | Brockmann et al. |
| 6,907,312 | B2 | 6/2005 | Sagawa et al. |
| 7,148,806 | B2 | 12/2006 | Anttila et al. |
| 7,243,516 | B2 | 7/2007 | Zusi |
| 7,289,873 | B2 * | 10/2007 | Redecker et al. ............. 700/174 |
| 7,309,306 | B2 | 12/2007 | Kitamura |
| 7,641,537 | B2 * | 1/2010 | Thyssen et al. ................... 451/5 |
| 7,883,303 | B2 * | 2/2011 | Tang et al. ..................... 409/232 |
| 2001/0052416 | A1 | 12/2001 | Wissmach et al. |
| 2003/0156401 | A1 | 8/2003 | Komine et al. |
| 2006/0127197 | A1 | 6/2006 | Storch et al. |
| 2006/0159533 | A1 | 7/2006 | Zeiler et al. |
| 2006/0290507 | A1 | 12/2006 | Greubel |
| 2007/0109103 | A1 | 5/2007 | Jedrey et al. |

FOREIGN PATENT DOCUMENTS

| EP | 1750185 | 7/2007 |
| JP | 2003-025177 | 2/2003 |
| WO | 2006066259 | 6/2006 |

OTHER PUBLICATIONS

SPIKE, News Release, Apr. 7, 2007, Pro Micron GmbH & Co., KG.

* cited by examiner

*Primary Examiner* — Will Fridie, Jr.
(74) *Attorney, Agent, or Firm* — Larry R. Meenan, Esq.

(57) ABSTRACT

A system manages a machine tool operation. The system includes a cutting tool, which includes a tool body; an integrated circuit chip securely mounted within the tool body and capable of being read and written upon; and a read/write device for communicating with the integrated circuit chip. The integrated circuit chip is an RFID chip. The tool body may be a mounting chuck, adapter, twist drill, thread tap, indexable drill, milling cutter or a square shank lathe tool.

71 Claims, 12 Drawing Sheets

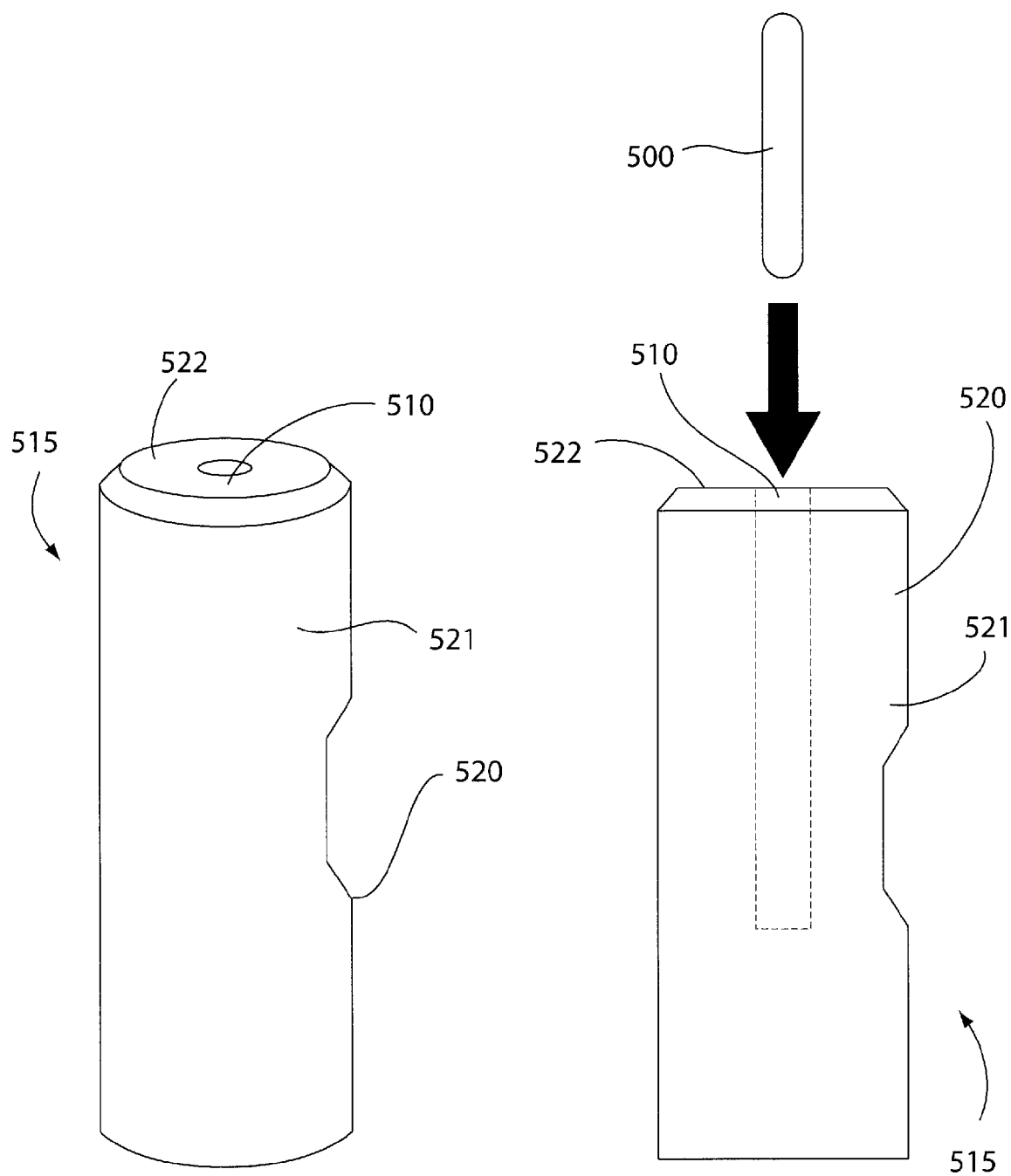
FIG. 6A FIG. 6B

CUTTING TOOL WITH INTEGRATED CIRCUIT CHIP

CROSS-REFERENCE TO RELATED APPLICATION

This application claims priority from U.S. Provisional Patent Application No. 61/012,818, filed Dec. 11, 2007, which is hereby incorporated herein by reference in its entirety.

BACKGROUND OF THE INVENTION

1. Field of the Invention

The invention relates to a cutting tool having an integrated circuit chip securely mounted therein. More specifically, the present invention relates to a cutting tool having an RFID chip mounted therein, the RFID chip being encoded with data regarding the cutting tool and communicating with a system for utilizing the data encoded on the RFID chip for controlling a machining operation, tracking tool usage, and storing data on prior use of a particular cutting tool.

2. Description of Related Art

There exists a multitude of cutting tools used for machining and, in particular, used for metal cutting operations. Oftentimes, a number of tools are very similar in appearance but may not be effective for significantly different applications. As an example, the tip features of a drill may not be significantly different, but may be intended for machining significantly different materials. Furthermore, in another example, a drill having an identical geometry but with a different hardened coating may be suitable for machining one material and unsuitable for machining another material. Therefore, visual identification of the proper tool may be difficult. Additionally, a typical tool crib may have hundreds of different cutting tools and identification of the optimum tool for a particular job may be challenging. As a result, tool containers have been bar coded and the bar code of these containers is associated with a data set identifying details of the cutting tool and optimal conditions for which the cutting tool is suited. However, utilizing a bar code on the exterior of the tool package or, for that matter on the tool itself, requires accessing a remote database to extract features of the cutting tool. Occasionally, manufacturers do not maintain databases beyond a certain life for tools and, as a result, there may be no information available for an older tool even though there is a bar code associated with it. Furthermore, it is necessary to maintain a central database for a very large number of different tools.

Additionally, there is a desire to not only extract pre-existing information about the tool but, furthermore, to maintain a history of usage of the tool to better predict when the tool should be replaced, when the tool should be sharpened or when the tool is no longer suitable for one task, but may be suitable for another less demanding task. The currently used bar code system is not capable of efficiently storing and processing this information.

Accordingly, there is a general need in the art for a system that stores, for easy retrieval, the operational data and on-going history of a cutting tool as it is used for one or more cutting operations.

It is an object of the present invention to provide a system where operational data for a cutting tool and data regarding use of a particular tool may be encoded in an integrated circuit chip mounted within the cutting tool or contained in a remote database and easily accessible via a unique tool identification encoded on the chip such that the data can be retrieved instantly and accurately without the need to consult catalogs, handbooks, websites, and archived files and the data remains accurate for the entire useful life of the cutting tool.

There is a need to provide a system where operational data and data regarding use of a particular tool may be programmed directly into a controller for a machine tool to control a machining operation thus simplifying the manufacturing process, minimizing human interaction and error during a machining operation, reducing set up time prior to initiating a machining operation, preventing tool failure and material waste caused by tool failure, and achieving a more financially beneficial manufacturing process.

There is a need to provide a system where real time feedback regarding a machining operation may be communicated between the integrated circuit chip in the cutting tool and the controller for automatic adjustment of the parameters of a machining operation.

There is a need to provide a system where the integrated circuit chip additionally allows for simplified tool management and location tracking of the cutting tool and easy sorting of a plurality of tools contained within a tool room by data such as lot number and composition.

SUMMARY OF THE INVENTION

According to an embodiment of the present invention, a cutting tool for machining a workpiece is provided. The cutting tool includes a tool body having a shank; and an integrated circuit chip securely mounted within the shank of the tool body and capable of being read and written upon. The integrated circuit chip is an RFID chip.

According to further embodiment of the present invention, a system for managing a machine tool operation is provided. The system includes a cutting tool, the cutting tool including a tool body having a shank; an integrated circuit chip securely mounted within the shank of the tool body and capable of being read and written upon; and a read/write device for communicating with the integrated circuit chip. The integrated circuit chip is an RFID chip.

According to a further embodiment of the present invention, a method for managing a machine tool operation is provided. The method includes the steps of: providing a cutting tool, the cutting tool including a tool body having a shank; providing an integrated circuit chip securely mounted within the shank of the tool body and capable of being read and written upon, wherein the integrated circuit chip is an RFID chip; and providing a read/write device for communicating with the integrated circuit chip; establishing a communication link between the chip and the read/write device; and uploading data regarding the cutting tool from the integrated circuit chip to the read/write device.

Further details and advantages of the invention will become clear upon reading the following detailed description in conjunction with the accompanying drawing figures, wherein like parts are designated with like reference numerals throughout.

BRIEF DESCRIPTION OF THE DRAWINGS

FIGS. 6A-6B show a perspective view and a side view of a cutting tool having an integrated circuit chip embedded in a glass capsule mounted in the cutting tool according to an embodiment of the present invention;

DETAILED DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
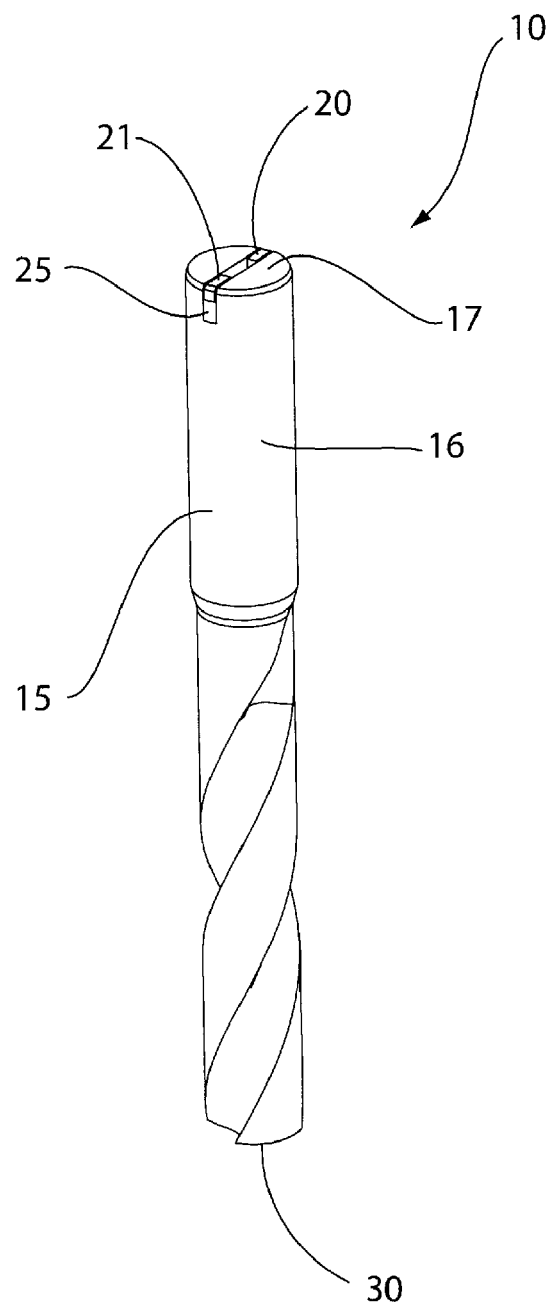
FIG. 1 shows a perspective view of a solid round cutting tool having an integrated circuit chip mounted therein according to an embodiment of the present invention.

With reference to FIG. 1, a cutting tool 10, in the form of a drill bit having a drill tip 30, for machining a workpiece, according to an embodiment of the present invention, is shown. The cutting tool 10 includes a tool body 15 having a shank 16. An integrated circuit chip 20 in the form of an RFID chip 20 is securely mounted within the shank 16 of the tool body 15 in a transverse groove 25 extending across an end 17 of the shank 16. As shown, the RFID chip 20 is an antenna-less RFID chip 20 that includes at least one electrical contact 21 and is capable of being read and written upon by a read/write device via the at least one electrical contact 21. The RFID chip 20 is mounted within the transverse groove 25 such that a portion of the chip 20, particularly the at least one electrical contact 21, is disposed flush with the end 17 of the shank 16, and is, therefore, at least partially exposed to an exterior of the shank 16. It should be noted that the RFID chip 20 is positioned away from the tip 30 of the drill 10 to minimize exposure to heat and to the harsh environment to which the drill 10 may be exposed during a machining operation.

Figure 2:
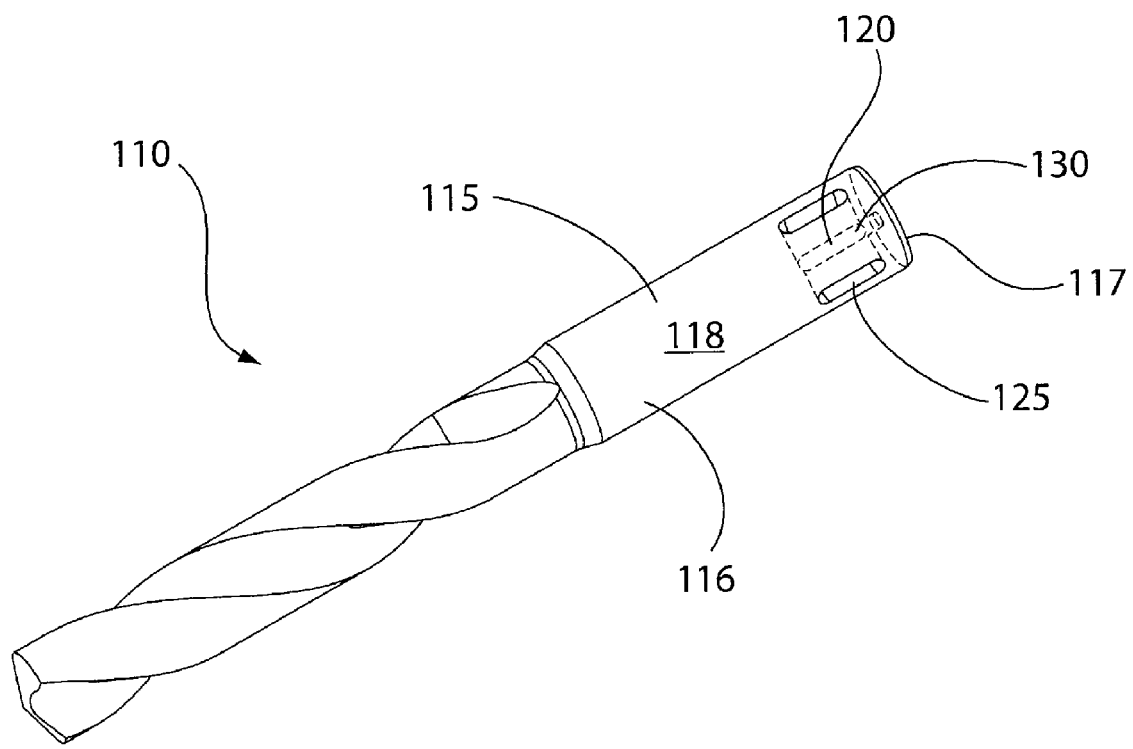
FIG. 2 shows a perspective view of another embodiment of a solid round cutting tool having a chip mounted therein.

With reference to FIG. 2, an alternative embodiment of a cutting tool 110, in the form of a drill bit, for machining a workpiece, is shown. The cutting tool 110 includes a tool body 115 having a shank 116. The shank 116 of the tool body 115 includes an axially extending bore 130 that extends into the shank 116 from the end 117 of the shank 116 along an axis of the cutting tool 110. An integrated circuit chip 120 in the form of an RFID chip 120 is securely mounted within the shank 116 of the tool body 115 in the axially extending bore 130. The RFID chip 120 includes an antenna (not shown) and is capable of being read and written upon remotely by a read/write device via radio transmissions between the RFID chip 120 and the read/write device. To that end, the shank 116 includes a plurality of radially extending slots 125 extending outward from the axially extending bore 130 such that the RFID chip 120 is at least partially exposed to an exterior of the shank 116 through the end 117 of the shank 116 via the axially extending bore 130 and through the side 118 of the shank 116 via the radially extending slots 125. This arrangement reduces interference with the radio transmissions between the RFID chip 120 and the read/write device normally caused by the metal or carbide material forming the cutting tool 110. As in the embodiment shown in FIG. 1, the RFID chip 120 is positioned away from the tip of the cutting tool 110 to minimize exposure to heat and to the harsh environment to which the cutting tool 110 may be exposed during a machining operation. Although the bore 130 and the slots 125 are illustrated as being empty, with the exception of the RFID chip 120, it is to be appreciated that the bore 130 and the slots 125 may be filled with a non-electrically conducting material, such as a polymer resin or epoxy. This would protect the chip 120 while at the same time permit signal reception and transmission from the chip 120.

Figure 3:
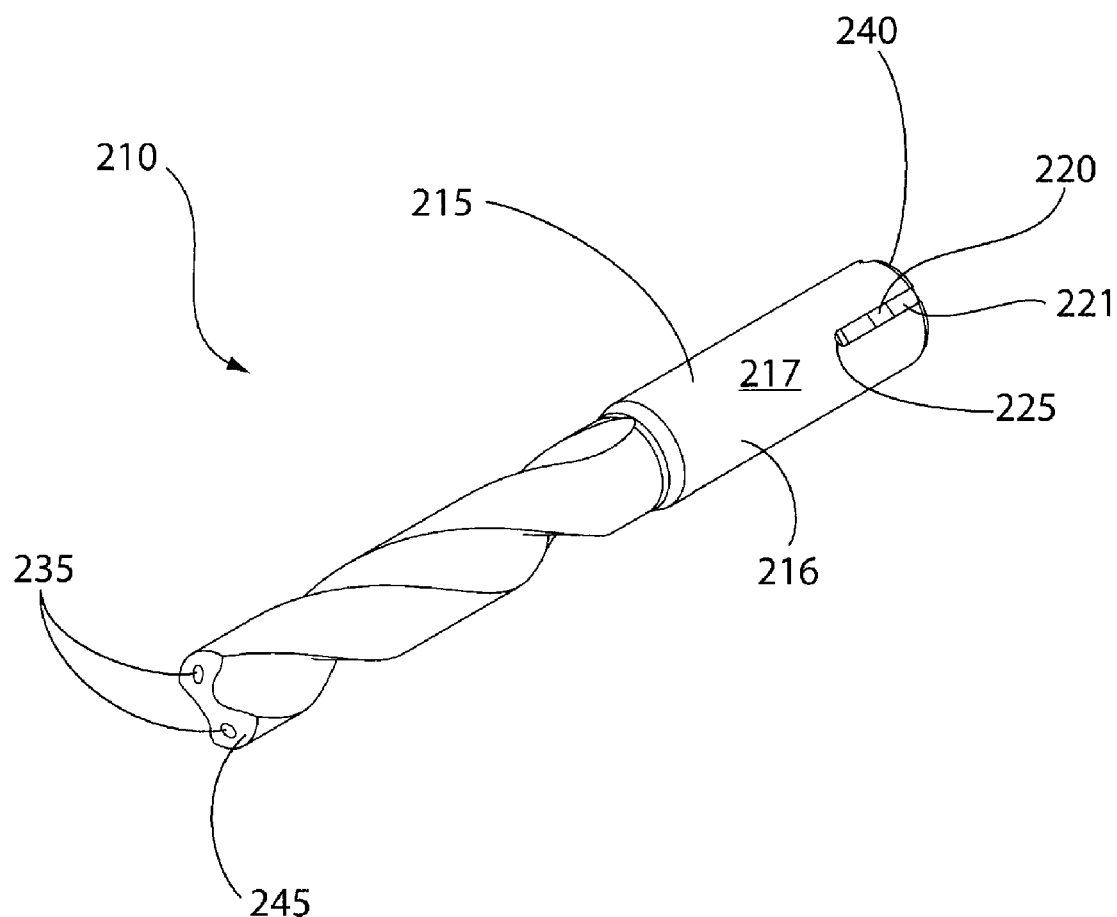
FIG. 3 shows a perspective view of another embodiment of a solid round cutting tool having a chip mounted therein.

With reference to FIG. 3, an alternative embodiment of a cutting tool 210, in the form of a drill bit having a drill tip 245 for machining a workpiece, is shown. The cutting tool 210 includes a tool body 215 having a shank 216. An integrated circuit chip 220 in the form of an RFID chip 220 is securely mounted within the shank 216 of the tool body 215 in a longitudinally extending groove 225 extending in a side 217 of the shank 216 from the end 240 of the shank 216. As shown, the RFID chip 220 is an antenna-less RFID chip 220 that includes at least one electrical contact 221 and is capable of being read and written upon by a read/write device via the at least one electrical contact 221. The RFID chip 220 is mounted within the longitudinally extending groove 225 such that a portion of the chip 220, particularly the at least one electrical contact 221, is disposed flush with the side 217 of the shank 216, and is, therefore, at least partially exposed to an exterior of the shank 216. As in the embodiments shown in FIGS. 1 and 2, the RFID chip 220 is positioned away from the tip 245 of the drill 210 to minimize exposure to heat and to the harsh environment to which the drill 210 may be exposed during a machining operation. Further, placement of the RFID chip 220 in the side 217 of the shank 216 allows coolant to flow from the end 240 of the shank 216 to the drill tip 245 via coolant channels 235 extending through the tool body 215 without physical interference from the RFID chip 220.

Figure 4:
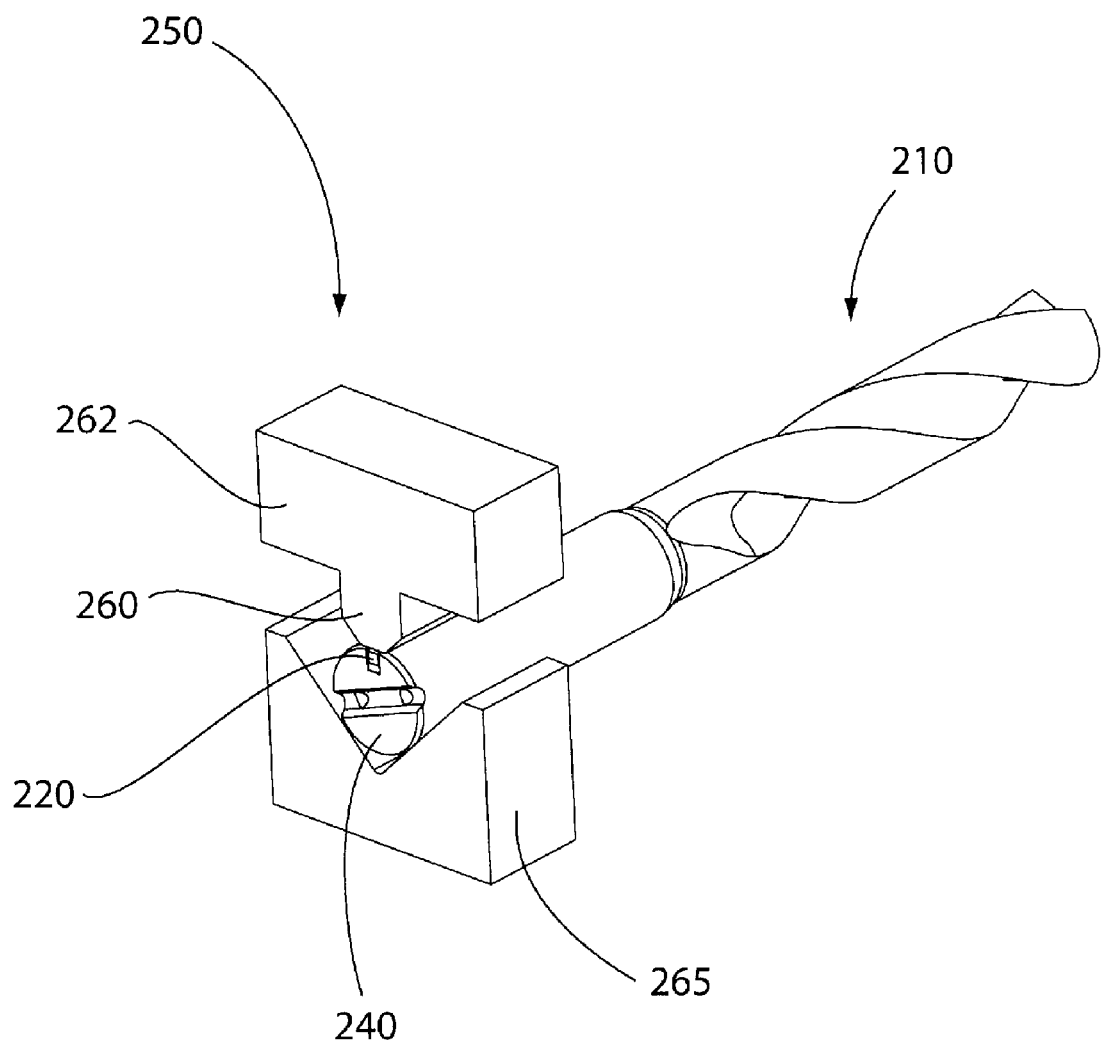
FIG. 4 shows a perspective view of a solid round cutting tool positioned within a tool holder having a read/write device according to an embodiment of the present invention.
Figure 11:
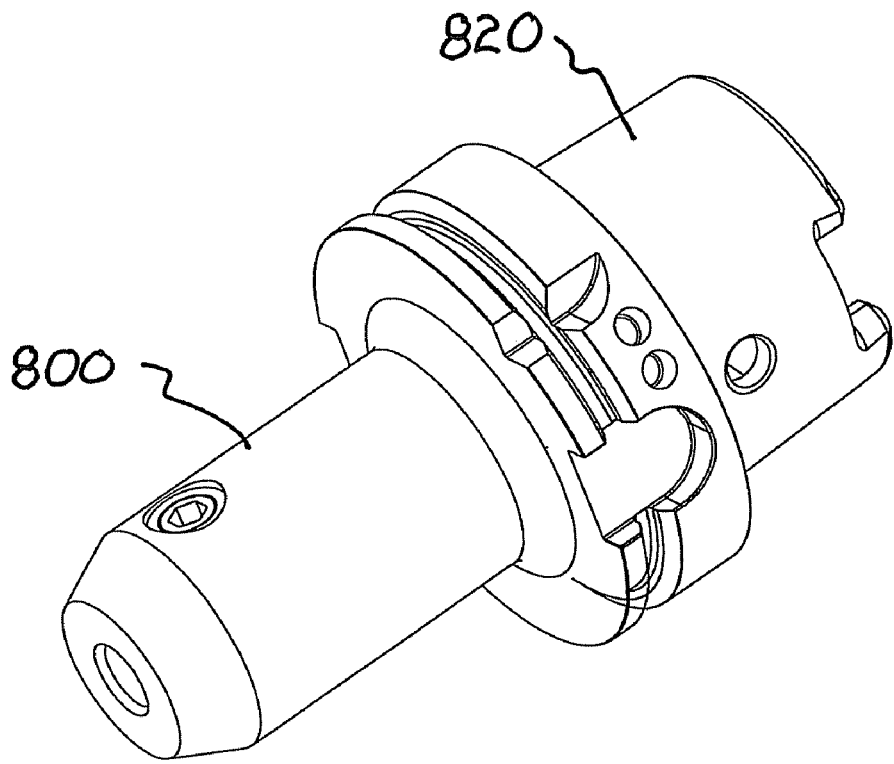
FIG. 11 shows a perspective view of a mounting chuck within which the read/write device may be positioned and of an adapter system within which the read/write device may be positioned.
Figure 12:
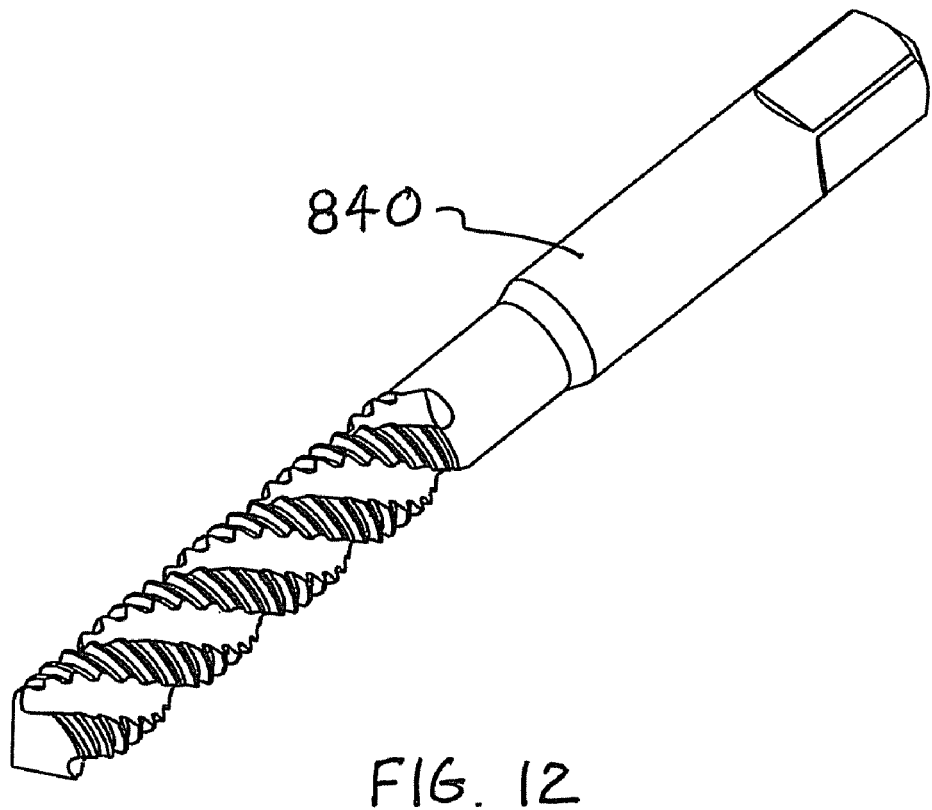
FIG. 12 shows a perspective view of a thread tap within which the integrated circuit chip may be mounted.
Figure 14:
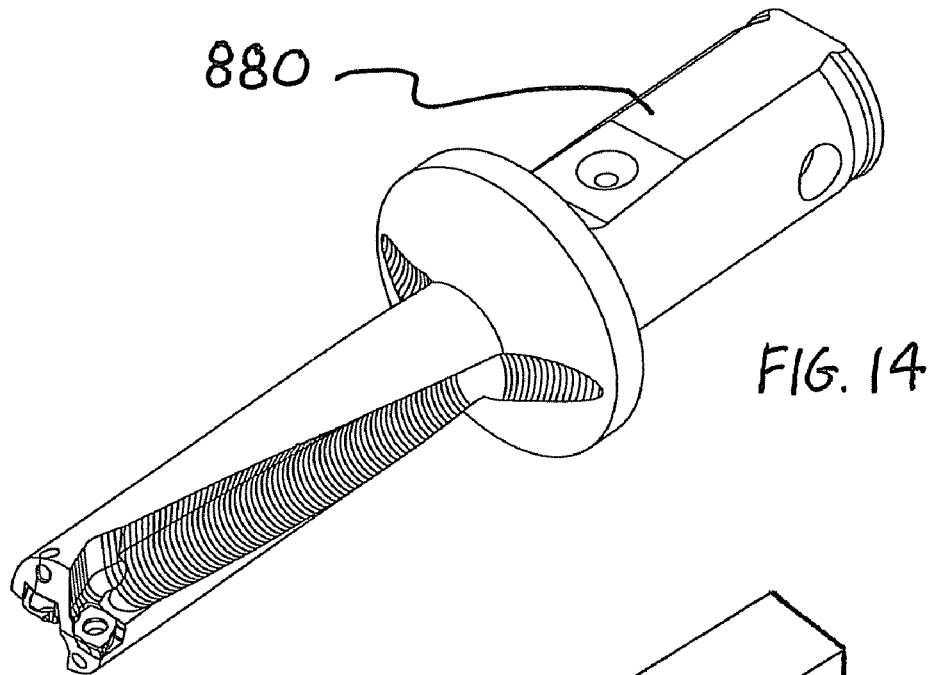
FIG. 14 shows a perspective view of an indexable drill within which the integrated circuit chip may be mounted.
Figure 13:
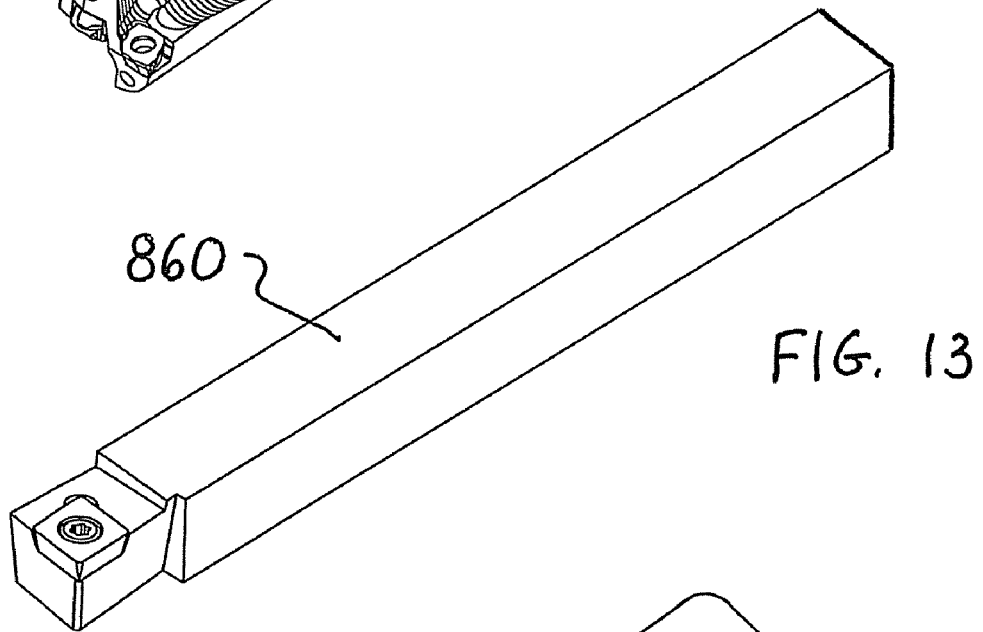
FIG. 13 shows a perspective view of a square shank lathe tool within which the integrated circuit chip may be mounted.
Figure 15:
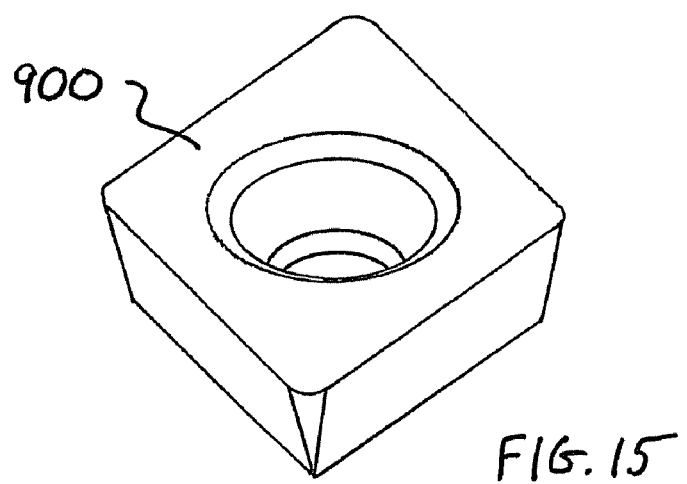
FIG. 15 shows a perspective view of a cutting insert within which the integrated circuit chip may be mounted.

With reference to FIG. 4, a tool holder 250 having a reading head 260, according to an embodiment of the present invention, is shown. A read/write device (not shown) is disposed within the reading head 260, which is disposed on an upper block 262 of the tool holder 250. A cutting tool 210 is held by the tool holder 250 between the reading head 260 and a lower, V-shaped block 265 such that the reading head 260 is disposed adjacent to the RFID chip 220 mounted within the cutting tool 210. To that end, the upper block 262 and/or the lower, V-shaped block 265 of the tool holder 250 may be spring-loaded or hydraulically-loaded to clamp upon cutting tools 210 of various diameters. The read/write device may include one or more probes (not shown) for engaging an electrical contact 221 on the chip 220 to establish a direct communication link between the read/write device and the chip 220 or may include an antenna for establishing a remote radio communication link between the read/write device and the chip 220. As shown, the tool holder 250 is suitable for holding a cutting tool 210 having a chip 220 mounted within the side 217 of the cutting tool 210, as discussed previously with reference to FIG. 3. It is to be appreciated that the tool holder 250 may be modified to hold various configurations of cutting tools, such as the cutting tool 10, discussed above with reference to FIG. 1, where the chip 20 is mounted within the end 17 of the cutting tool 10, such that the reading head 260 becomes disposed adjacent to the chip 20 when the cutting tool 10 is disposed on the tool holder 250. It is also to be appreciated that the read/write device may be incorporated into alternative structures. For instance, the read/write device could be a portable, hand held reader/scanner device familiar to those of ordinary skill in the art or, alternatively the read/write device could be positioned within a mounting chuck 800 (FIG. 11) or adapter system 820 (FIG. 11) for attaching the cutting tool 210 to a machine tool.

Figure 5:
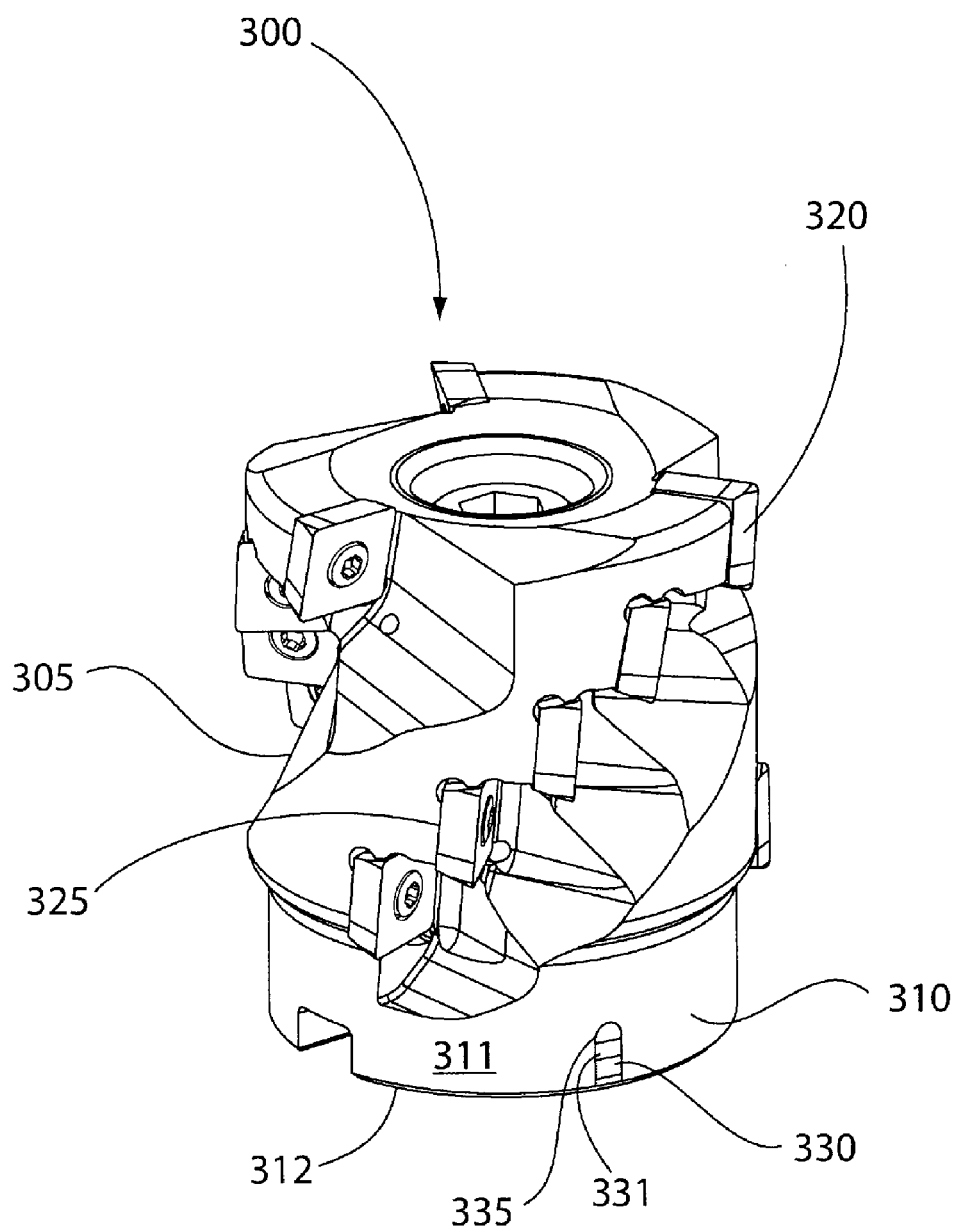
FIG. 5 shows a perspective view of a milling cutting tool having an integrated circuit chip mounted therein according to an embodiment of the present invention.

With reference to FIG. 5, an alternative embodiment of a cutting tool 300, in the form of a milling cutter 300, for machining a workpiece is shown. The milling cutter 300 includes a tool body 305 having a shank 310 and a plurality of cutting inserts 320 removably disposed within mounting pockets 325 formed about the tool body 305. An integrated circuit chip 330 in the form of an RFID chip 330 is securely mounted within the shank 310 of the tool body 305 in a longitudinally extending groove 335 extending in a side 311 of the shank 310 from the end 312 of the shank 310. As shown, the RFID chip 330 is an antenna-less RFID chip 330 that includes at least one contact 331 and is capable of being read and written upon by a read/write device via the at least one contact 331. The RFID chip 330 is mounted within the longitudinally extending groove 335 such that a portion of the chip 330, particularly the at least one contact 331, is disposed flush with the side 311 of the shank 310 and is therefore at least partially exposed to an exterior of the shank 310. Alternatively, the RFID chip 330 may be mounted within a transverse groove formed in the end 312 of the shank 310, as discussed above with reference to FIG. 1, or may include an antenna such that the RFID chip 330 may be mounted within a bore formed in the shank 310, as discussed above with reference to FIG. 2.

It is to be appreciated that the subject invention is suitable for a wide variety of cutting tools used for machining operations in addition to the drill bits 10, 110, 210 illustrated in FIGS. 1-3 and the milling cutter 300 illustrated in FIG. 5. For instance, the RFID chip 330 and associated system of the present invention may additionally be incorporated into thread taps 840, square shank lathe tools 860, indexable drills 880, and cutting inserts 900 illustrated in FIGS. 12-15 respectively.

With reference to FIGS. 6A-6B an alternative embodiment of a cutting tool 515 for machining a workpiece, similar to the embodiment shown in FIG. 2, is shown. The cutting tool 515 includes a tool body 520 having a shank 521. The shank 521 of the tool body 520 includes an axially extending bore 510 that extends into the shank 521 from the end 522 of the shank 521 along an axis of the cutting tool 515. An integrated circuit chip (not shown) in the form of an RFID chip is embedded in a capsule 500, which is securely mounted within the shank 521 of the tool body 520 in the axially extending bore 510. The capsule 500 may be made of glass or another non-electrically conducting material. The RFID chip includes an antenna (not shown) and is capable of being read and written upon remotely by a read/write device via radio transmissions between the RFID chip and the read/write device. As discussed above with reference to FIG. 2, the shank 521 may further include a plurality of radially extending slots extending radially outward from the axially extending bore 510 such that the capsule 500 is at least partially exposed to an exterior of the shank 521 through the end 522 of the shank 521 via the axially extending bore 510 and via the radially extending slots. The capsule 500 shields the RFID chip such that the RFID chip must include an antenna for remote radio communication between the RFID chip and the read/write device. Due to the relatively small size of the antenna disposed on the RFID chip and interference caused by the metal or carbide material of the cutting tool 515, the antenna may have a limited range of approximately 30 mm. Thus, the read/write device must be placed in close proximity with the RFID chip in order to establish a wireless communication link with the chip. It is to be appreciated that the RFID chip embedded within the capsule 500 may include an antenna adapted to transmit and receive signals at high or low radio frequencies.

Figure 7A:
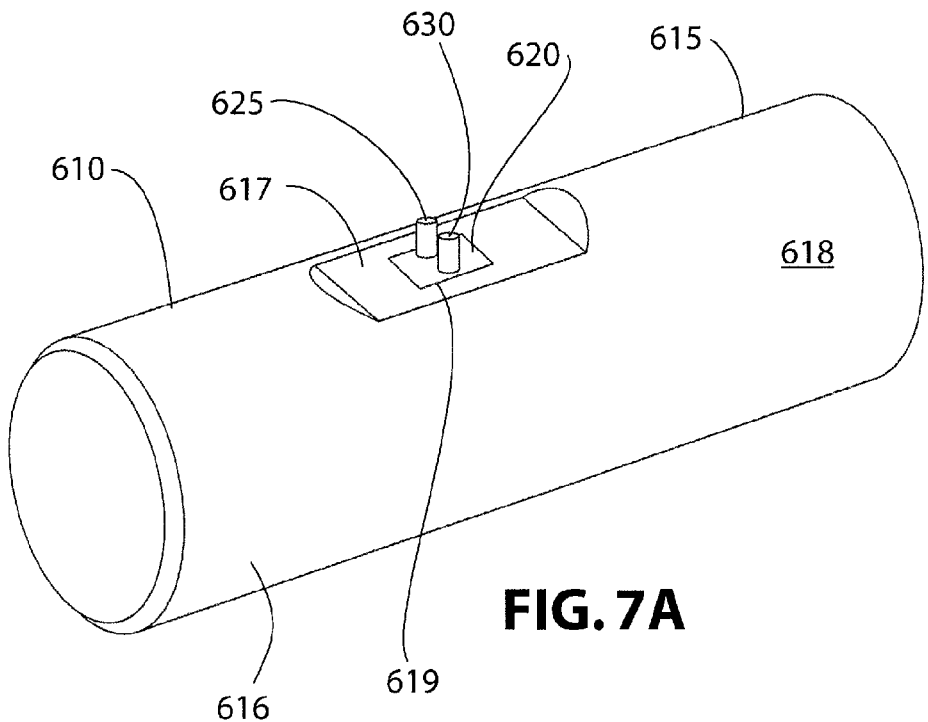
FIGS. 7A-7C show perspective, top plan and side views of a cutting tool having an integrated circuit chip in the form of a touch chip mounted in the cutting tool according to an embodiment of the present invention.
Figure 7B:
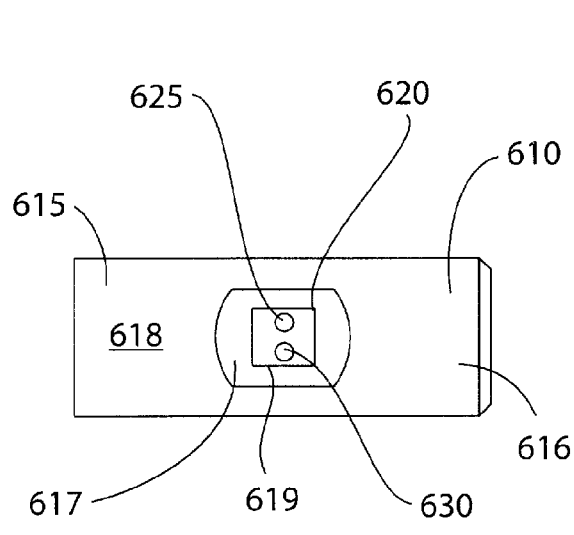
Figure 7C:
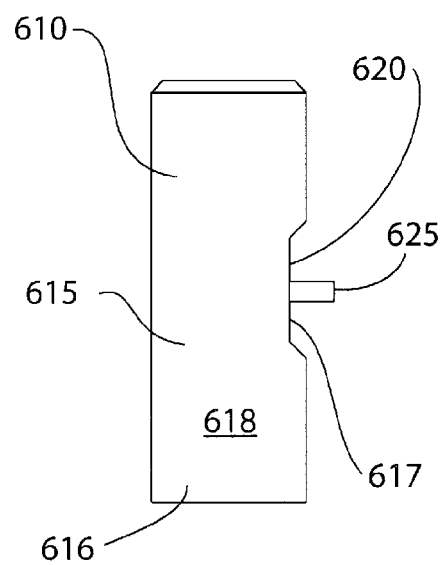

With reference to FIGS. 7A-7C, an alternative embodiment of a cutting tool 610 for machining a workpiece is shown. The cutting tool 610 includes a tool body 615 having a shank 616. The shank 616 of the tool body 615 includes a flat recessed portion 617, particularly a Weldon flat 617, formed in a side 618 of the shank 616. A cavity 619 is formed within the flat recessed portion 617. An integrated circuit chip 620 in the form of an RFID chip 620 is securely mounted within the shank 616 of the tool body 615 in the cavity 619. As shown, the RFID chip 620 is an antenna-less RFID chip 620 that includes two electrical contacts 625, 630 arranged side-by-side on the RFID chip 620 and is capable of being read and written upon by a read/write device via at least one of the two electrical contacts 625, 630 with the other of the two electrical contacts 625, 630 being provided for redundancy. The RFID chip 620 is mounted within the cavity 619 such that a portion of the RFID chip 620, particularly a top surface of the chip 620, is disposed flush with the flat recessed portion 617 of the shank 616 and is therefore at least partially exposed to an exterior of the shank 616. The electrical contacts 625, 630 extend radially from the chip 620 away from the flat recessed portion 617 of the shank 616. The particular embodiment shown in FIGS. 7A-7C allows for placement of the RFID chip 620 such that the RFID chip 620 does not weaken the structural strength of the cutting tool 610 and does not physically interfere with mounting the cutting tool 610 to the mounting chuck or adapter assembly of the machine tool. Further, as the electrical contacts 625, 630 extend away from the shank 616 of the tool body 615, a direct engagement between RFID chip 620 and the read/write device is more easily achieved.

Figure 8A:
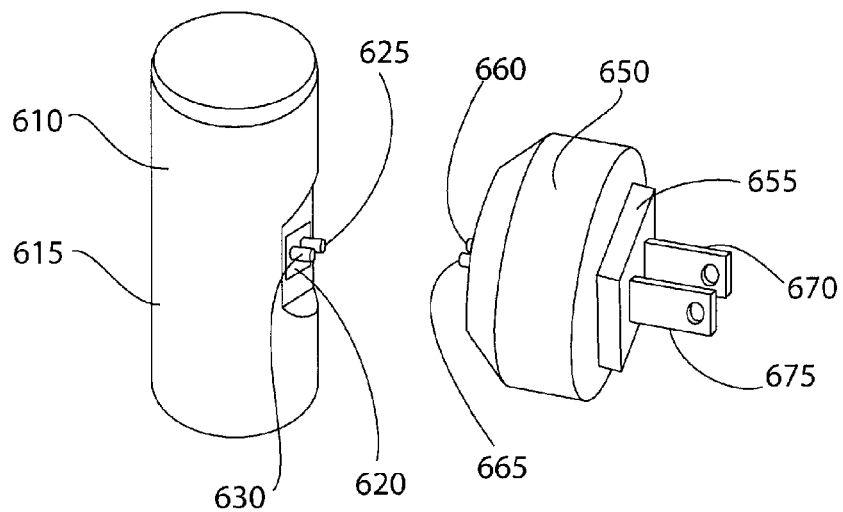
FIGS. 8A-8C show perspective, top plan and side views of a touch sensor utilized to read a touch chip mounted in a cutting tool according to an embodiment of the present invention.
Figure 8B:
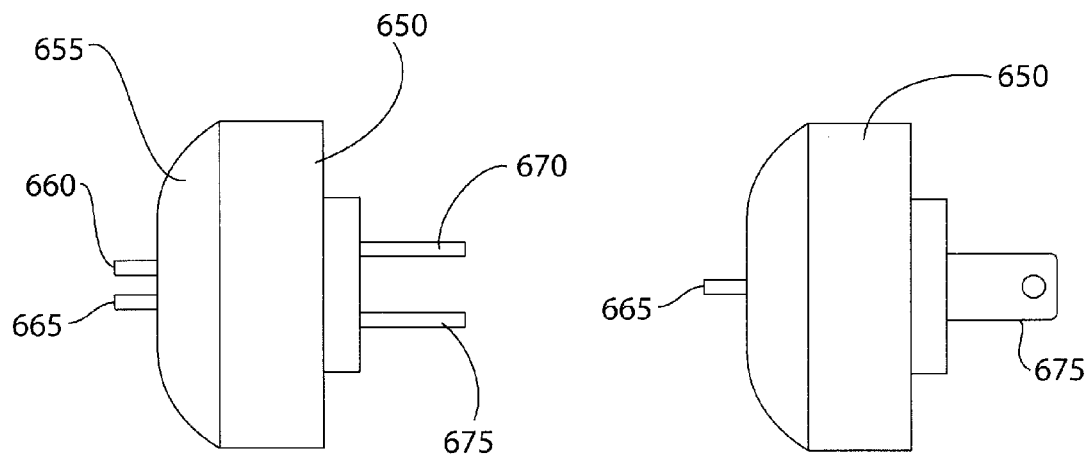
Figure 8C:
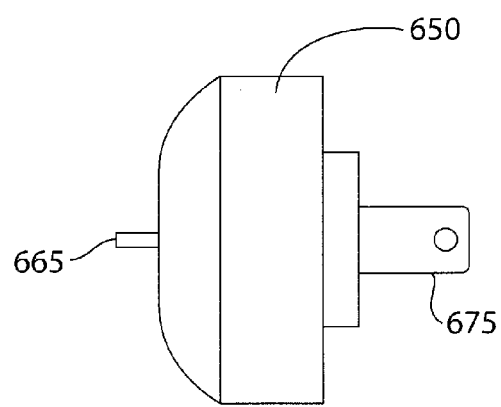

With reference to FIGS. 8A-8C, a touch sensor 650 suitable for use with a read/write device in order to read data from and write data upon the RFID chip 620 is shown. The touch sensor 650 includes a body 655 with two probes 660, 665 extending from the body 655. The probes 660, 665 are adapted to engage the electrical contacts 625, 630 on the RFID chip 620 disposed within the tool body 615 of the cutting tool 610 so as to establish a direct communication link between the RFID chip 620 and the read/write device for transmitting and uploading data from the RFID chip 620 to the read/write device or for writing data from the read/write device to the RFID chip 620. As shown, the touch sensor 650 further includes two prongs 670, 675 extending from the body 655 opposite the two probes 660, 665. The probes 660, 665 are electrically connected to the prongs 670, 675 and the prongs 670, 675 may be inserted or otherwise connected or attached to the read/write device. Alternatively, the touch sensor 650 and the probes 660, 665 may be hardwired into the read/write device, such that the prongs 670, 675 are unnecessary.

Figure 9:
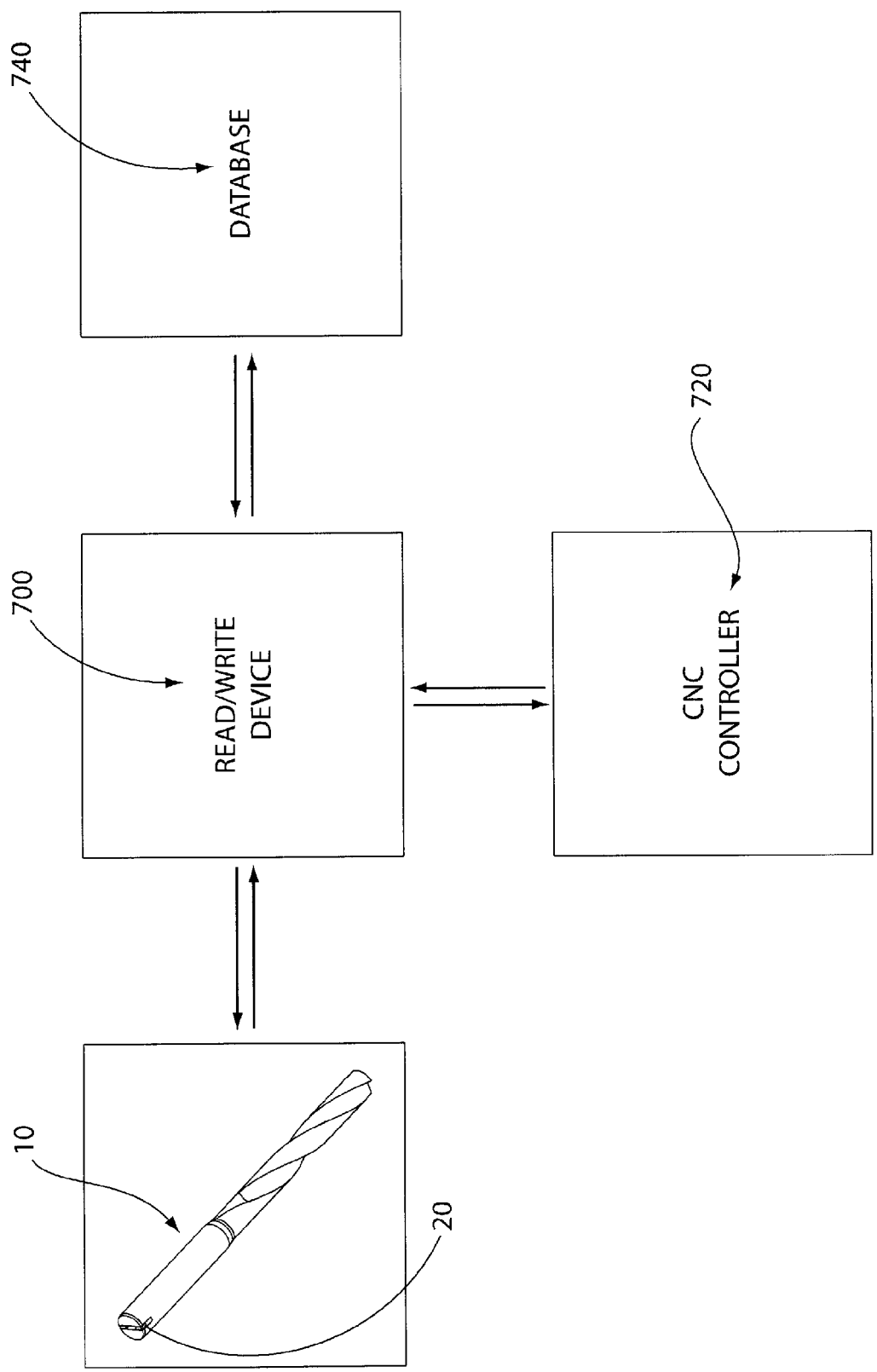
FIG. 9 shows a schematic illustration of a system architecture utilizing an integrated circuit chip mounted in a cutting tool according to an embodiment of the present invention.

With reference to FIG. 9, a schematic depiction of a system for managing a machine tool operation utilizing a cutting tool 10 having an RFID chip 20 mounted therein, in accordance with an embodiment of the present invention, is shown. As shown, the system includes the cutting tool 10 having an integrated circuit chip 20, in the form of an RFID chip 20, mounted therein, as has been previously discussed with reference to the aforementioned embodiments, and a read/write device 700 for communicating with the RFID chip 20. The system further includes a controller 720, such as a typical CNC controller 720, for controlling operation of a machine tool for performing a machining operation with the cutting tool 10. The controller 720 receives operational data for the cutting tool 10 from the read/write device 700.

As shown in FIG. 9, the read/write device 700 is adapted to establish communication links with both the RFID chip 20 and the controller 720 such that the read/write device 700 is able to receive operational data for the cutting tool 10, which has been encoded on the RFID chip 20 and is transmitted from the RFID chip 20 to the read/write device 700, and transmit that data to the controller 720 for use in programming of the controller 720 to control a machining operation. As discussed above with regard to the previous embodiments, the communication link between the RFID chip 20 and the read/write device 700 may be established via a remote radio link between the RFID chip 20 and the read/write device 700 or may be established via a direct link formed by an engagement between at least one electrical contact disposed on the RFID chip 20 and a probe operatively associated with the read/write device 700. The communication link between the read/write device 700 and the controller 720 may be established through various techniques known to those of ordinary skill in the art, including a wireless connection or through hardwiring of the read/write device 700 into the controller 720 or a machine tool 710 (shown in FIG. 10) where the read/write device 700 is disposed within a mounting chuck or adapter assembly of the machine tool 710.

The RFID chip 20 is preferably encoded with and is capable of transmitting operational data to the read/write device, which is selected from the group consisting of: cutting speed and feed data for optimal machining, cutting tool size, cutting tool weight, cutting tool grade, engineering drawings or sketches of the cutting tool, data for regrinding of the cutting tool, material composition of the cutting tool, a Materials Safety Data Sheet (MSDS), tool tracking data, traceability data, tool identification number, maximum tool life data, optimal tool application/usage data, tool specific notes, and combinations thereof. It is to be appreciated that the above group is exemplary and further types of operational data, not listed, may be encoded on the RFID chip 20.

Additionally, the read/write device 700 is also adapted to receive data regarding usage of the cutting tool 10 from the controller 720 and write that data to the RFID chip 20 such that the information remains with the cutting tool 10 for future reference. Such data regarding usage, which is written to the RFID chip 20 by the read/write device 700, is selected from the group consisting of: cutting tool operation time, remaining cutting tool life information, cutting tool wear and failure information, characteristics of machining operations utilizing the cutting tool, and combinations thereof. It is to be appreciated that the above group is also exemplary and further types of data regarding usage of the cutting tool 10, not listed, may be written on the RFID chip 20 by the read/write device 700.

Alternatively, the RFID chip 20 is only encoded with a unique tool identification. In such an embodiment, the read/write device is adapted to establish communication links with the RFID chip 20, the controller 720 and a remote database 740. The read/write device 700 receives the unique tool identification from the RFID chip 720, transmits the unique tool identification to the remote database 740, receives the operational data for the cutting tool 10, discussed above, from the remote database 740, and then transmits the operational data for the cutting tool 10 to the controller 720 for programming of the controller 720. Additional to writing the data regarding usage of the cutting tool 10 to the RFID chip 20, the read/write device 700 may also, or alternatively, transmit the data regarding usage of the cutting tool to the remote database 740 for future reference.

As previously discussed, the read/write device 700 may communicate continuously with the RFID chip 20 and the controller 720 to provide tool feedback to the controller 720 in real time during a machining operation.

Figure 10:
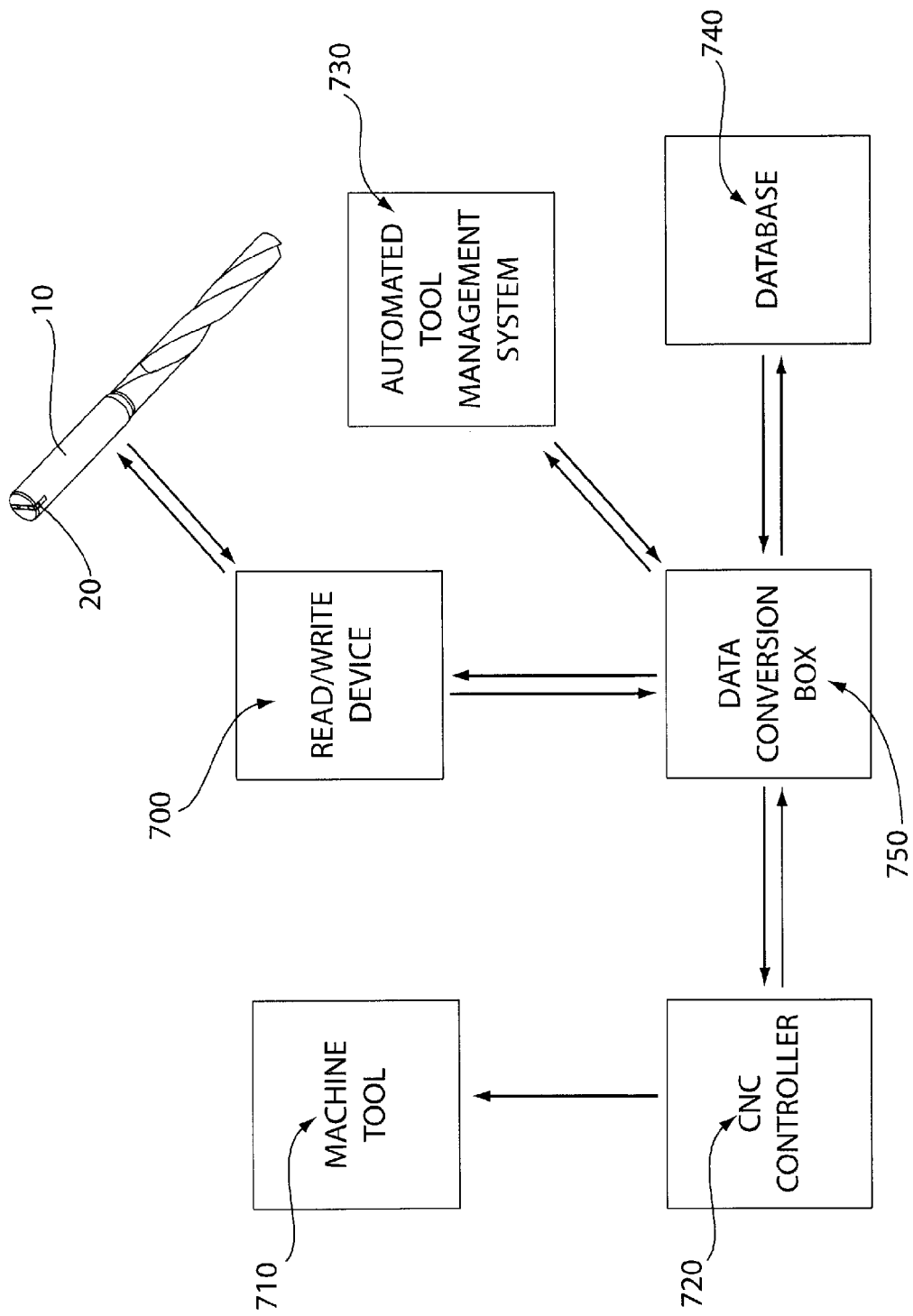
FIG. 10 shows a schematic illustration of another system architecture utilizing an integrated circuit chip mounted in a cutting tool according to an embodiment of the present invention.

With reference to FIG. 10, a schematic depiction of an expanded system for managing a machine tool operation utilizing a cutting tool 10 having an RFID chip 20 mounted therein, in accordance with an embodiment of the present invention, is shown. The expanded system includes the system elements and communication links shown in FIG. 9, as previously discussed, as well as various additional system elements. Particularly, as shown in FIG. 10, the expanded system further includes a machine tool 710 for performing a machining operation with the cutting tool 10. A machining operation performed by the machine tool 710 is controlled by the controller 720, which is programmed according to the data transmitted by the read/write device 700 to the controller 720, as discussed above.

As shown in FIG. 10, the expanded system may further include an automated tool management system 730 for storing and dispensing a plurality of cutting toots. The read/write device 700 communicates with the tool management system 730 to sort a plurality of cutting tools within a tool room and track the location of cutting tools that have been removed from the tool room.

Also, as shown in FIG. 10, the read/write device 700 may communicate with the controller 720, the remote database 740 and the automated tool management system 730 by establishing a communication link with a data conversion box 750 such that multiple communication links do not have to be established and maintained by the read/write device 700.

As illustrated by FIGS. 9 and 10, the use of an integrated circuit chip 20 having read/write capabilities with a cutting tool opens a very wide range of opportunities associated with the entire metalworking operation. In particular, data from the chip 20 may be transferred to or from the read/write device 700, which may also be a scanner. Although the chip 20 is illustrated in a tool 10 in a static position, it is entirely possible for the tool 10 to be operating and the chip 20 may still transmit and receive data to the read/write device 700, as previously discussed. In particular, during a machining operation, the chip 20 of the cutting tool 10 may, in real time, communicate data such as operating temperature, operating speed or any imbalance the tool 10 may be experiencing. This information may travel back to the read/write device 700 and then be transferred to the controller 720, which may make adjustments for optimum performance of the cutting tool 10. Additionally, information about the cutting tool 10 extracted from the read/write device 700 may be utilized to determine the tool life and/or wear of a particular cutting tool 10 and such information may be utilized to determine when it is appropriate to dispense a new tool 10 through the automated tool management system 730. Furthermore, the read/write device 700 may provide data regarding usage of the tool to the remote database 740 that not only will provide data on the overall performance of that family of cutting tools but, additionally, will provide individualized records for that particular cutting tool 10.

With reference to FIGS. 9 and 10, a method for managing a machine tool operation utilizing the system described above according to an embodiment of the present invention will now be described in detail. A cutting tool 10, including a tool body having a shank, an integrated circuit chip 20 in the form of an RFID chip 20, capable of being read and written upon, securely mounted within the shank of the tool body, and a read/write device 700 for communicating with the integrated circuit chip 20 are provided. The RFID chip 20 is mounted within shank of the tool body such that it is at least partially exposed to an exterior of the shank. A communication link between the chip 20 and the read/write device is established. Data regarding the tool 10 is uploaded from the integrated circuit chip 20 to the read/write device 700. The communication link between the integrated circuit chip 20 and the read/write device may be a remote radio link or a direct link formed by an engagement between at least one electrical contact disposed on the integrated circuit chip 20 and a probe operatively associated with the read/write device 700.

A machine tool 710 for performing a machining operation with the cutting tool 10 and a controller 720 for controlling operation of the machine tool 710 are provided. A communication link between the read/write device 700 and the controller 720 is established. Operational data for the cutting tool 10 is transmitted from the read/write device 700 to the controller 720. The controller 720 is programmed to control an operation of the machine tool 710 based upon the operational data for the cutting tool 10. The data regarding the cutting tool 10 may include the operational data for the cutting tool 10, which is encoded on the chip 20, and/or a unique tool identification. In the case where the data regarding the cutting tool 10 includes the unique tool identification, prior to transmitting operational data for the cutting tool 10 to the controller 720, a communication link between the read/write device 700 and a remote database 740 is established. The unique tool identification is transmitted from the read/write device 700 to the remote database 740. The operational data is then uploaded from the remote database 740 to the read/write device 700.

Data regarding usage of the cutting tool 10 is transmitted from the controller 720 to the read/write device 700. The data regarding usage of the cutting tool 10 is then written to the integrated circuit chip 20 with the read/write device 700. The data regarding usage of the cutting tool 10 may also be transmitted to the remote database 740 with the read/write device 700. Further, the steps of transmitting operational data for the cutting tool 10 to the controller 720, transmitting data regarding usage of the cutting tool 10 from the controller 720 to the read/write device 700, and writing the data regarding usage of the cutting tool 10 to the integrated circuit chip 20 with the read/write device 700 may be performed continuously during a machining operation.

By providing an integrated circuit chip 20 with each individual cutting tool 10, it is possible not only to retrieve technical data about that cutting tool 10, but it is also possible to track the history of that tool 10 such that any subsequent user may appreciate the wear and expected tool life remaining in that tool 10.

According to a further embodiment of the present invention, the RFID chips 20, 120, 220, 330 and 620, as well as the capsule 500, discussed above with reference to FIGS. 1-3 and 5-7C are secured within the shanks of the various cutting tools by non-conductive and heat resistant polymer resin or epoxy. The polymer resin or epoxy is preferably non-conductive so as not to cause electrical interference, which would disrupt the communication link between the chips 20, 120, 220, 330 and 620 and the read/write device 700. Additionally, the polymer resin or epoxy is preferably heat resistant so as to provide further protection to the chips 20, 120, 220, 330 and 620 from harsh environmental conditions during a machining operation.

A typical glass capsule RFID chip would be one provided with the Series 200 low-frequency micro-RFID evaluation kit Model RI-K3A-001A provided by Texas Instruments. A typical contact integrated circuit chip would be the chip associated with the Tag-it™ HF-I Standard Transponder Inlays provided by Texas Instruments. The contact integrated circuit chip is removed from the inlay and used without the associated antenna. Typical read/write devices used to upload data from and write data to the integrated circuit chips are known to those of ordinary skill in the art of RFID tagging.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A cutting tool for machining a workpiece, the tool comprising:
   a) a tool body; and
   b) an integrated circuit chip securely mounted to the tool body and capable of being read and written upon, wherein the integrated circuit chip is a read/write RFID chip, and wherein the integrated circuit chip has written thereupon data identifying prior usage of the tool for one or more machining operations, wherein the data is made up of cumulative cutting tool operation time used to determine remaining cutting tool life.

2. The cutting tool according to claim 1, wherein the RFID chip is mounted within the tool body such that the chip is at least partially exposed to an exterior of the tool body.

3. The cutting tool according to claim 1, wherein the integrated circuit chip is secured within the tool body by non-conductive and heat resistant polymer resin or epoxy.

4. The cutting tool according to claim 1, wherein the integrated circuit chip is encoded with operational data for the cutting tool, the operational data being selected from the group consisting of: cutting speed and feed data for optimal machining, cutting tool size, cutting tool weight, cutting tool grade, engineering drawings or sketches of the cutting tool, data for regrinding of the cutting tool, material composition of the cutting tool, a Materials Safety Data Sheet (MSDS), tool tracking data, traceability data, tool identification number, maximum tool life data, optimal tool application/usage data, tool specific notes, and combinations thereof.

5. The cutting tool according to claim 1, wherein the integrated circuit chip includes additional data regarding usage of the cutting tool, the data regarding prior usage directed to characteristics of machining operations utilizing the cutting tool.

6. The cutting tool according to claim 1, wherein the RFID chip is embedded in a capsule and is capable of being remotely read and written upon.

7. The cutting tool according to claim 6, wherein the tool body includes an axially extending bore extending from an end of the tool body along an axis of the cutting tool and wherein the RFID chip is securely mounted within the axially extending bore.

8. The cutting tool according to claim 7, wherein the tool body further includes a plurality of radially extending slots extending outward from the axially extending bore to a side of the tool body.

9. The cutting tool according to claim 1, wherein the RFID chip is an antenna-less RFID chip comprising at least one electrical contact and capable of being read or written upon via the at least one electrical contact.

10. The cutting tool according to claim 9, wherein the tool body includes a transverse groove extending across an end thereof and wherein the RFID chip is securely mounted within the transverse groove such that a portion of the chip is disposed flush with the end of the tool body.

11. The cutting tool according to claim 9, wherein the tool body includes a longitudinally extending groove extending within a side of the tool body from an end thereof and wherein the RFID chip is securely mounted within the longitudinally extending groove such that a portion of the chip is disposed flush with the side of the tool body.

12. The cutting tool according to claim 9, wherein the tool body includes a flat recessed portion formed in a side thereof and a cavity formed within the flat recessed portion of the tool body and wherein the RFID chip is securely mounted within the cavity such that a portion of the chip is disposed flush with the flat recessed portion of the tool body, the at least one electrical contact of the chip extending radially from the chip away from the flat recessed portion of the tool body.

13. The cutting tool according to claim 12, wherein the at least one electrical contact comprises two electrical contacts arranged side-by-side on the RFID chip.

14. A system for managing a machine tool operation, comprising:
  a) a cutting tool, the cutting tool including a tool body;
  b) an integrated circuit chip securely mounted within the tool body and capable of being read and written upon; and
  c) a read/write device for communicating with the integrated circuit chip,
  wherein the integrated circuit chip is a read/write RFID chip, and
  wherein the integrated circuit chip is a read/write RFID chip, and wherein the integrated circuit chip has written thereupon data identifying prior usage of the tool for one or more machining operations, wherein the data is made up of cumulative cutting tool operation time used to determine remaining cutting tool life.

15. The system according to claim 14, wherein the RFID chip is mounted within the tool body such that the chip is at least partially exposed to an exterior of the tool body.

16. The system according to claim 14, wherein the integrated circuit chip is secured within the shank by non-conductive and heat resistant polymer resin or epoxy.

17. The system according to claim 14, wherein the integrated circuit chip is encoded with operational data for the cutting tool and is capable of transmitting the operational data to the read/write device, the operational data being selected from the group consisting of: cutting speed and feed data for optimal machining, cutting tool size, cutting tool weight, cutting tool grade, engineering drawings or sketches of the cutting tool, data for regrinding of the cutting tool, material composition of the cutting tool, a Materials Safety Data Sheet (MSDS), tool tracking data, traceability data, tool identification number, maximum tool life data, optimal tool application/usage data, tool specific notes, and combinations thereof.

18. The system according to claim 14, wherein the integrated circuit chip is written upon by the read/write device with additional data regarding usage of the cutting tool, wherein the data regarding prior usage is directed to characteristics of machining operations utilizing the cutting tool.

19. The system according to claim 14, wherein the RFID chip is embedded in a capsule and is capable of being remotely read and written upon by the read/write device.

20. The system according to claim 19, wherein the tool body includes an axially extending bore extending from an end of the tool body along an axis of the cutting tool and wherein the RFID chip is securely mounted within the axially extending bore.

21. The system according to claim 20, wherein the tool body further includes a plurality of radially extending slots extending outward from the axially extending bore to a side of the tool body.

22. The system according to claim 14, wherein the RFID chip is an antenna-less RFID chip comprising at least one electrical contact and capable of being read or written upon by the read/write device via the at least one electrical contact.

23. The system according to claim 22, wherein the read/write device includes a touch sensor having at least one probe adapted to engage the at least one electrical contact on the RFID chip so as to establish a direct link between the RFID chip and the read/write device.

24. The system according to claim 22, wherein the tool body includes a transverse groove extending across an end thereof and wherein the RFID chip is securely mounted within the transverse groove such that a portion of the chip is disposed flush with the end of the tool body.

25. The system according to claim 22, wherein the tool body includes a longitudinally extending groove extending within a side of the tool body from an end thereof and wherein the RFID chip is securely mounted within the longitudinally extending groove such that a portion of the chip is disposed flush with the side of the tool body.

26. The system according to claim 22, wherein the tool body includes a flat recessed portion formed in a side thereof and a cavity formed within the flat recessed portion of the tool body and wherein the RFID chip is securely mounted within the cavity such that a portion of the chip is disposed flush with the flat recessed portion of the tool body, the at least one electrical contact of the chip extending radially from the chip away from the flat recessed portion of the tool body.

27. The system according to claim 26, wherein the at least one electrical contact comprises two electrical contacts arranged side-by-side on the RFID chip.

28. The system according to claim 14, further comprising:
  a machine tool for performing a machining operation with the cutting tool; and
  a controller for controlling operation of the machine tool, wherein the controller receives operational data for the cutting tool from the read/write device.

29. The system according to claim 28, wherein the read/write device is adapted to establish communication links with the RFID chip and the controller for receiving operational data for the cutting tool from the RFID chip and transmitting the operational data for the cutting tool to the controller for programming of the controller.

30. The system according to claim 29, wherein the read/write device receives data regarding usage of the cutting tool from the controller and writes the data regarding usage of the cutting tool to the RFID chip.

31. The system according to claim 28, wherein the read/write device is adapted to establish communication links with the RFID chip, the controller and a remote database for receiving a unique tool identification from the RFID chip, transmitting the unique tool identification to the remote database and receiving operational data for the cutting tool from the remote database, and transmitting the operational data for the cutting tool to the controller for programming of the controller.

32. The system according to claim 31, wherein the read/write device is further adapted to receive data regarding usage of the cutting tool from the controller, transmit the data regarding usage of the cutting tool to the remote database, and write the data regarding usage of the cutting tool to the RFID chip.

33. The system according to claim 28, wherein the read/write device communicates continuously with the RFID chip and the controller so as to provide real-time tool feedback to the controller during a machining operation.

34. The system according to claim 14, wherein the read/write device is disposed within a reading head disposed on a block forming part of a holder for the tool body.

35. The system according to claim 14, further comprising an automated tool management system for storing and dispensing a plurality of cutting tools, wherein the read/write device communicates with the tool management system to sort the plurality of cutting tools and track cutting tool locations.

36. A method for managing a machine tool operation, comprising the steps of:
   a) providing a cutting tool, the cutting tool including a tool body;
   b) providing an integrated circuit chip securely mounted within the tool body and capable of being read and written upon, wherein the integrated circuit chip is a read/write RFID chip;
   c) providing a read/write device for communicating with the integrated circuit chip;
   d) establishing a communication link between the chip and the read/write device; and
   e) uploading data regarding the cutting tool from the integrated circuit chip to the read/write device
   f) providing a machine tool for performing a machining operation with the cutting tool;
   g) providing a controller for controlling operation of the machine tool;
   h) establishing a communication link between the read/write device and the controller;
   i) transmitting operational data for the cutting tool from the read/write device to the controller;
   j) programming the controller to control an operation of the machine tool based upon the operational data for the cutting tool;
   k) transmitting data regarding usage of the cutting tool from the controller to the read/write device; and
   l) writing the data regarding usage of the cutting tool to the integrated circuit chip with the read/write device;
   wherein the data regarding usage of the cutting tool is selected from the group consisting of: cutting tool operation time, remaining cutting tool life information, cutting tool wear and failure information.

37. The method according to claim 36, wherein the RFID chip is mounted within the tool body such that the chip is at least partially exposed to an exterior of the tool body.

38. The method according to claim 36, wherein the communication link between the integrated circuit chip and the read/write device is a remote radio link.

39. The method according to claim 36, wherein the communication link between the chip and the read/write device is a direct link formed by an engagement between at least one electrical contact disposed on the integrated circuit chip and a probe operatively associated with the read/write device.

40. The method according to claim 36, wherein the operational data for the cutting tool is selected from the group consisting of: cutting speed and feed data for optimal machining, cutting tool size, cutting tool weight, cutting tool grade, engineering drawings or sketches of the cutting tool, data for regrinding of the cutting tool, material composition of the cutting tool, a Materials Safety Data Sheet (MSDS), tool tracking data, traceability data, tool identification number, maximum tool life data, optimal tool application/usage data, tool specific notes, and combinations thereof.

41. The method according to claim 36, wherein the data regarding the cutting tool includes the operational data for the cutting tool, which is encoded on the integrated circuit chip.

42. The method according to claim 36, wherein the data regarding the cutting tool includes a unique tool identification.

43. The method according to claim 42, wherein, prior to the step of transmitting operational data for the cutting tool to the controller, the method further comprises the steps of: establishing a communication link between the read/write device and a remote database; transmitting the unique tool identification from the read/write device to the remote database; and uploading the operational data from the remote database to the read/write device.

44. The method according to claim 36, further comprising the step of:
   m) transmitting the data regarding usage of the cutting tool to a remote database with the read/write device.

45. The method according to claim 36, wherein the steps of transmitting operational data for the cutting tool to the controller, transmitting data regarding usage of the cutting tool from the controller to the read/write device, and writing the data regarding usage of the cutting tool to the integrated circuit chip with the read/write device are performed continuously during a machining operation.

46. The method according to claim 36, wherein the data regarding usage of the cutting tool is directed to characteristics of machining operations utilizing the cutting tool, and combinations thereof.

47. The cutting tool according to claim 1, wherein the tool body is a rotating tool with a shank and the integrated circuit chip is mounted within the shank.

48. The cutting tool according to claim 47, wherein the tool body is a twist drill.

49. The cutting tool according to claim 47, wherein the tool body is a thread tap.

50. The cutting tool according to claim 47, wherein the tool body is an indexable drill.

51. The cutting tool according to claim 1, wherein the tool body is a milling cutter.

52. The cutting tool according to claim 1, wherein the tool body is a square shank lathe tool.

53. The cutting tool according to claim 1, wherein the tool body is a cutting insert.

54. The system according to claim 14, wherein the tool body is a rotating tool with a shank and the integrated circuit chip is mounted within the shank.

55. The system according to claim 14, wherein the tool body is a milling cutter.

56. The system according to claim 14, wherein the tool body is a square shank lathe tool.

57. The system according to claim 14, wherein the tool body is a cutting insert.

58. The system according to claim 14, further including a mounting chuck for holding the tool body and wherein the read/write device is mounted within the mounting chuck.

59. The system according to claim 14, further including an adapter system for holding the tool body and wherein the read/write device is mounted within the adapter system.

60. The method according to claim 36, wherein the tool body is a rotating tool with a shank and the integrated circuit chip is mounted within the shank.

61. The method according to claim 36, wherein the tool body is a milling cutter.

62. The method according to claim 36, wherein the tool body is a square shank lathe tool.

63. The method according to claim 36, wherein the tool body is a cutting insert.

64. A cutting tool for machining a workpiece, the tool comprising:
  a) a tool body having a shank; and
  b) an integrated circuit chip securely mounted within the shank of the tool body and capable of being read and written upon,
  wherein the integrated circuit chip is an RFID chip and wherein the RFID chip is an antenna-less RFID chip comprising at least one electrical contact and capable of being read or written upon via the at least one electrical contact, and
  wherein the tool body includes a flat recessed portion formed in a side thereof and a cavity formed within the flat recessed portion of the tool body and wherein the RFID chip is securely mounted within the cavity such that a portion of the chip is disposed flush with the flat recessed portion of the tool body, the at least one electrical contact of the chip extending radially from the chip away from the flat recessed portion of the tool body.

65. The cutting tool according to claim 64, wherein the at least one electrical contact comprises two electrical contacts arranged side-by-side on the RFID chip.

66. A system for managing a machine tool operation, comprising:
  a) a cutting tool, the cutting tool including a tool body having a shank;
  b) an integrated circuit chip securely mounted within the shank of the tool body and capable of being read and written upon; and
  c) a read/write device for communicating with the integrated circuit chip,
  wherein the integrated circuit chip is an RFID chip and wherein the RFID chip is an antenna-less RFID chip comprising at least one electrical contact and capable of being read or written upon by the read/write device via the at least one electrical contact, and
  wherein the read/write device includes a touch sensor having at least one probe adapted to engage the at least one electrical contact on the RFID chip so as to establish a direct link between the RFID chip and the read/write device.

67. The system according to claim 66, wherein the tool body includes a flat recessed portion formed in a side thereof and a cavity formed within the flat recessed portion of the tool body and wherein the RFID chip is securely mounted within the cavity such that a portion of the chip is disposed flush with the flat recessed portion of the tool body, the at least one electrical contact of the chip extending radially from the chip away from the flat recessed portion of the tool body.

68. The system according to claim 67, wherein the at least one electrical contact comprises two electrical contacts arranged side-by-side on the RFID chip.

69. A system for managing a machine tool operation, comprising:
  a) a cutting tool, the cutting tool including a tool body having a shank;
  b) an integrated circuit chip securely mounted within the shank of the tool body and capable of being read and written upon;
  c) a read/write device for communicating with the integrated circuit chip,
  wherein the integrated circuit chip is an RFID chip; and
  d) an automated tool management system for storing and dispensing a plurality of cutting tools, wherein the read/write device communicates with the tool management system to sort the plurality of cutting tools and track cutting tool locations.

70. A method for managing a machine tool operation, comprising the steps of:
  a) providing a cutting tool, the cutting tool including a tool body having a shank;
  b) providing an integrated circuit chip securely mounted within the shank of the tool body and capable of being read and written upon, wherein the integrated circuit chip is an RFID chip;
  c) providing a read/write device for communicating with the integrated circuit chip;
  d) establishing a communication link between the chip and the read/write device, wherein the communication link between the chip and the read/write device is a direct link formed by an engagement between at least one electrical contact disposed on the integrated circuit chip and a probe operatively associated with the read/write device; and
  e) uploading data regarding the cutting tool from the integrated circuit chip to the read/write device.

71. A method for managing a machine tool operation, comprising the steps of:
  a) providing a cutting tool, the cutting tool including a tool body;
  b) providing an integrated circuit chip securely mounted within the tool body and capable of being read and written upon, wherein the integrated circuit chip is a read/write RFID chip;
  c) providing a read/write device for communicating with the integrated circuit chip;
  d) establishing a communication link between the chip and the read/write device; and
  e) subsequent to using the cutting tool in a machining operation, writing data identifying prior usage of the tool for one or more machining operations, wherein the data is made up of cumulative cutting tool operation time used to determine remaining cutting tool life.

* * * * *

UNITED STATES PATENT AND TRADEMARK OFFICE
CERTIFICATE OF CORRECTION

PATENT NO. : 8,316,742 B2
APPLICATION NO. : 12/331966
DATED : November 27, 2012
INVENTOR(S) : Karen Anne Craig et al.

Page 1 of 1

It is certified that error appears in the above-identified patent and that said Letters Patent is hereby corrected as shown below:

IN THE SPECIFICATION

In Column 8, Line 43, delete "toots." and insert -- tools. --, therefor.

IN THE CLAIMS

In Column 13, Line 46, in Claim 36, delete "device; and" and insert -- device; --, therefor.

In Column 13, Line 48, in Claim 36, delete "device" and insert -- device; --, therefor.

Signed and Sealed this
Twenty-third Day of April, 2013

Teresa Stanek Rea
*Acting Director of the United States Patent and Trademark Office*